C. GERBEN.
AUTOMOBILE LOCK.
APPLICATION FILED DEC. 23, 1920. RENEWED NOV. 15, 1921.

1,433,367.

Patented Oct. 24, 1922.

WITNESSES

INVENTOR
CHARLES GERBEN.
BY
ATTORNEYS

Patented Oct. 24, 1922.

1,433,367

UNITED STATES PATENT OFFICE.

CHARLES GERBEN, OF NEW YORK, N. Y.

AUTOMOBILE LOCK.

Application filed December 23, 1920, Serial No. 432,744. Renewed November 15, 1921. Serial No. 515,426.

*To all whom it may concern:*

Be it known that I, CHARLES GERBEN, a citizen of the United States and a resident of the city of New York, borough of the Bronx, in the county of Bronx and State of New York, have invented a new and Improved Automobile Lock, of which the following is a full, clear, and exact description.

This invention relates to locks for automobiles and has for an object to provide a construction which is an improvement over my former Patent No. 1,354,963.

Another object is to provide a construction which will be neat and strong and at the same time effectively lock certain operating parts of the automobile against movement.

An additional object of the invention is to provide a lock in which the locking mechanism is operated through the use of a traveling member associated with a key actuating lock mechanism.

In the accompanying drawings—

Figure 1:
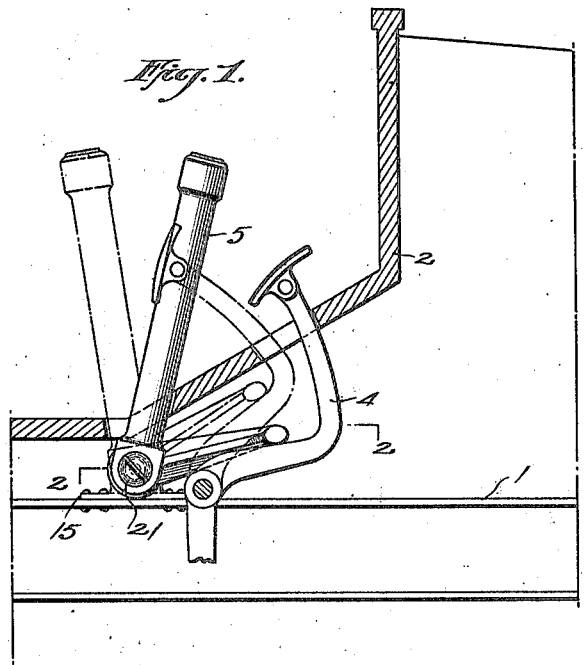
Figure 1 is a fragmentary sectional view through part of an automobile with a lock disclosing the invention applied thereto.

Referring to the accompanying drawings by numeral, 1 indicates part of the chassis of the automobile and 2 the dash-board thereof. The automobile is, of course, provided with pedals 3 and 4 which by suitable connecting mechanism may operate the clutch and brake. When these pedals are moved to a forward position they are in what may be termed an inoperative position with the clutch thrown out and the brake applied. In using a device embodying the invention, these pedals are forced to their forward or inoperative position as just set forth and the locking bar 5 swung over to the position shown in Figure 1. As this bar carries an arm 6, said arm will be moved with the bar and will rest against the pedals 3 and 4 so as to prevent any return movement thereof in case the bar 5 is locked in its forward or operated position. In order to positively hold the bar 5 in its forward or operative position as shown in Figure 1, said bar is constructed hollow and supplied with a lock mechanism 7 which may be operated by a key 8 for rotating the mechanism which is connected in any suitable manner with the sleeve 9 whereby when the mechanism of lock 7 is rotated, sleeve 9 will also be rotated. Usually the lock mechanism 7 is an ordinary tumbler lock. The sleeve 9 has an internal thread which meshes with the thread of the extension 10, said extension projecting from the bar 11 slidingly positioned in the lower part of the hollow bar 5. Bar 11 acts as a latch and is provided with a reduced portion 12 at the lower end which is adapted to fit into a reduced section 13 of a shaft 14. The shaft 14 is rigidly secured to a bracket or fitting 15 riveted or otherwise rigidly secured to the chassis 1 and extends a sufficient distance from this bracket to form a bearing for the sleeve 16 integral with the bar 5 and arm 6.

The sleeve 16 is provided with a toothed end 17 fitting into a smaller toothed end in bracket 15 whereby a clutch structure is presented. Preferably the bracket 15 is provided with an overhanging shoulder or bead 18 which covers up the teeth 17. As shown by dotted lines in Figure 3 eight teeth are shown for the clutch 17 but more or less could be used without departing from the spirit of the invention. When the teeth 17 are interlocked with the teeth on the bracket 15, bar 5 and arm 6 cannot move. In order that this may take place the end portion or section 12 is forced into the reduced section 13 of the shaft 14. This will positively prevent any movement of the sleeve 16 longitudinally of said shaft and will, consequently, lock the parts in the position shown in Figure 1. The sleeve 16 is provided with a recess 19 for accommodating the spring 20 which spring acts on the sleeve 16 and the head of screw 21, continually urging the sleeve 16 so that the clutch teeth 17 will remain interlocked.

Figure 3:
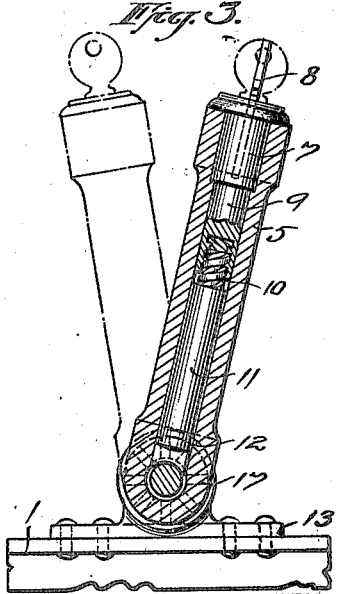
Figure 3 is a vertical longitudinal sectional view through the locking arm shown in Figure 1.

When the parts are in their locked position as shown in Figure 3, it is only necessary to turn the key 8 so that the sleeve 9 will rotate in such a direction as to cause the threads thereon to pull on the threaded extension 10 and move the section 12 out of engagement with the shaft 14. This will release the bar 5 but in order to move the bar and arm 6 it will be necessary to pull the sleeve 16 away from the bracket 15 against the action of spring 19 and then rotate the parts to the new position desired.

Figure 2:
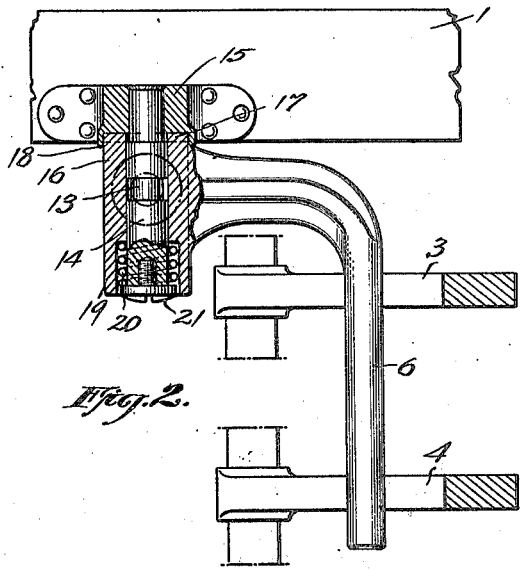
Figure 2 is a fragmentary sectional view through Figure 1 approximately on line 2—2.

The locking arm 6 may be used with any form of control mechanism for an automobile including the usual construction now in use. In certain classes of automobiles a planetary system is used. With certain systems the locking arm 6 and associated parts could be used with the planetary drive as well as with the arrangement of pedals as shown in Figure 2.

What I claim is:—

1. In a device of the character described a a locking arm, a locking bar connected with said arm, a clutch for rigidly holding said bar and said arm in any adjusted position, a movable member for locking the clutch against disengagement and means including a key operated mechanism for operating said member.

2. A locking device for preventing the theft of automobiles comprising a locking arm for holding certain mechanism of the automobile against actuation, a locking bar connected with said arm, a clutch for locking said arm and locking bar against movement, a sliding member for preventing disengagement of said clutch and means including a rotating sleeve and a key operated locking mechanism for shifting said sliding member to an operative and inoperative position.

3. A locking device for automobiles for preventing theft comprising a locking bar positioned to hold certain parts of the automobile mechanism against movement, said locking arm being formed with a sleeve and with a hollow locking bar, a clutch co-acting with said sleeve for locking the same in any desired position, a supporting shaft having a reduced section, said shaft being fixed, a sliding member arranged in said hollow locking bar and formed with one end capable of entrance into said reduced section of said shaft while the other end is formed with a threaded projection, a sleeve having an internal threaded socket fitted into said bar and positioned to receive said threaded extension and a key operated locking mechanism for rotating said sleeve whereby said sliding member is moved back and forth to a locked and unlocked position.

4. A locking device for automobiles comprising a locking arm formed with a sleeve having a socket in one end and a toothed face on the opposite end acting as one face of the clutch, a bracket formed with projections acting as one face of the clutch and co-acting with the clutch face and sleeve for locking the sleeve in any adjusted position, a shaft rigidly secured to said bracket and extending through said sleeve, a spring arranged in the socket, a screw connected with said shaft and engaging said spring whereby the spring is pressed against said socket and acts to cause said clutch faces to remain in engagement and means co-acting with said sleeve for locking the sleeve against longitudinal movement, said means including a key operated lock mechanism.

5. A lock for automobiles for preventing theft comprising a locking bar, a clutch connected with said bar for holding the same in a locked position, a shaft having a shoulder and said shaft extending through part of said arm, a hollow locking bar extending from one end of said arm and radially in respect to the shaft, said bar being in line with said shoulder, a sliding member having an interlocking section adapted to interlock with said shoulder when in a locked position, said sliding member being also provided with a threaded extension at one end, a rotatable sleeve mounted in said bar and provided with a threaded socket for receiving said threaded extension and a key operated lock mechanism for rotating said sleeve whereby when it is rotated in one direction the action of said threads on said extension will move said sliding member out of engagement with said shaft and when moved in the opposite direction will move said sliding member into engagement with said shaft whereby said clutch is in a locked position or is released.

CHARLES GERBEN.